July 20, 1937. W. MAIER 2,087,520
CUTTING MACHINE
Filed June 17, 1936 4 Sheets-Sheet 1

INVENTOR
WILLIAM MAIER
BY J.G. Cook
ATTORNEY

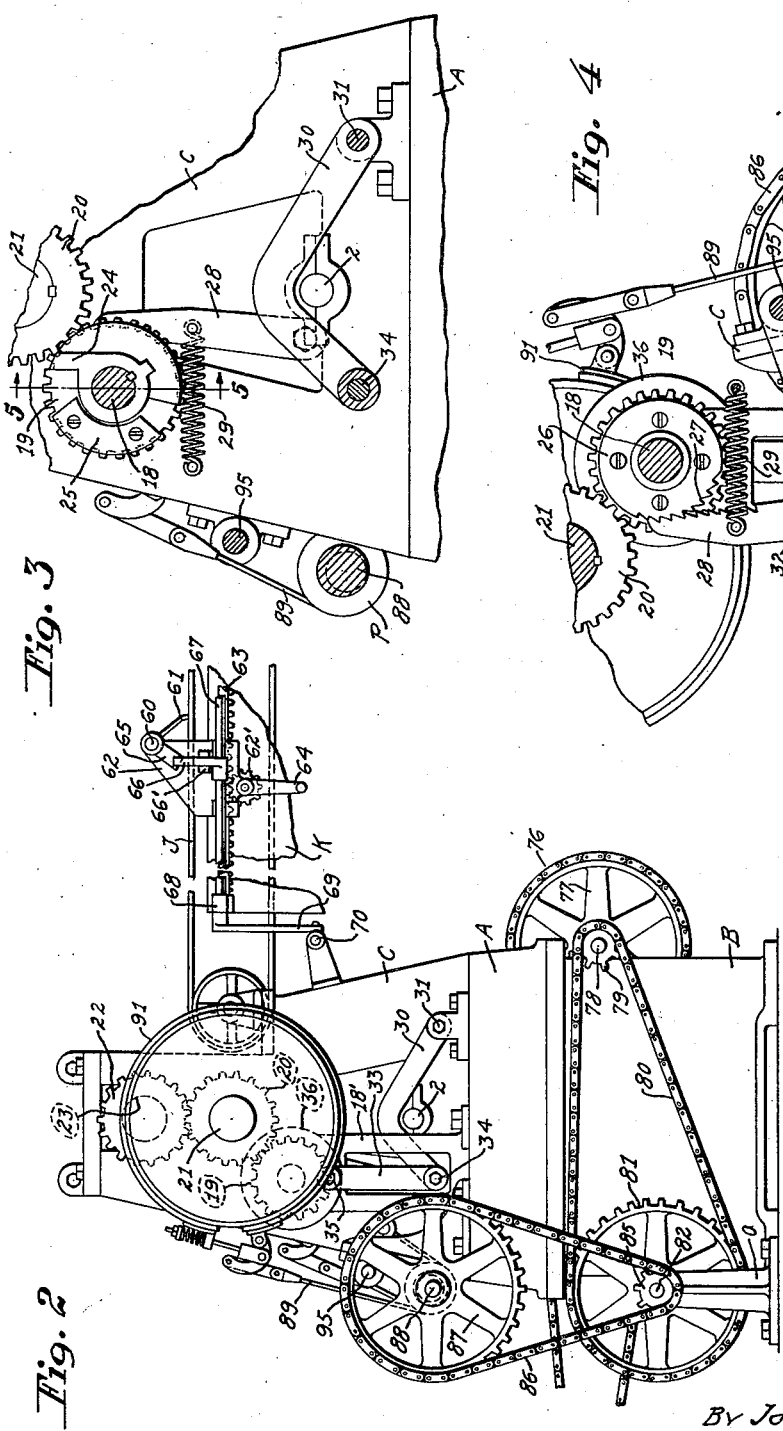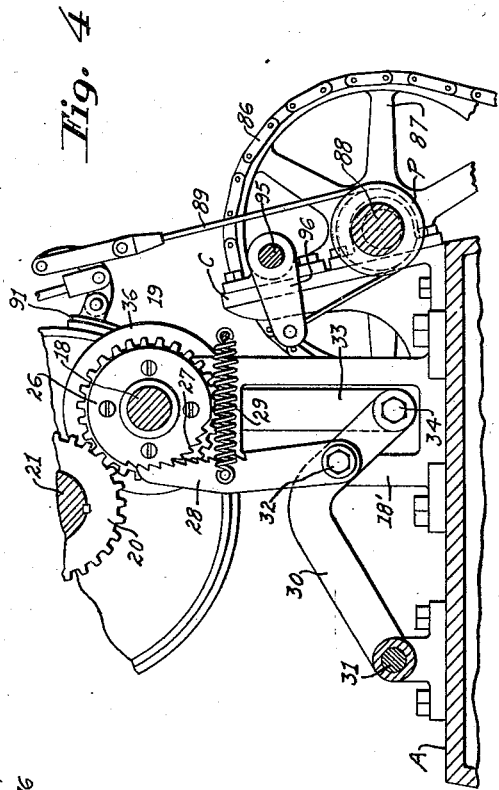

July 20, 1937.  W. MAIER  2,087,520
CUTTING MACHINE
Filed June 17, 1936   4 Sheets-Sheet 3
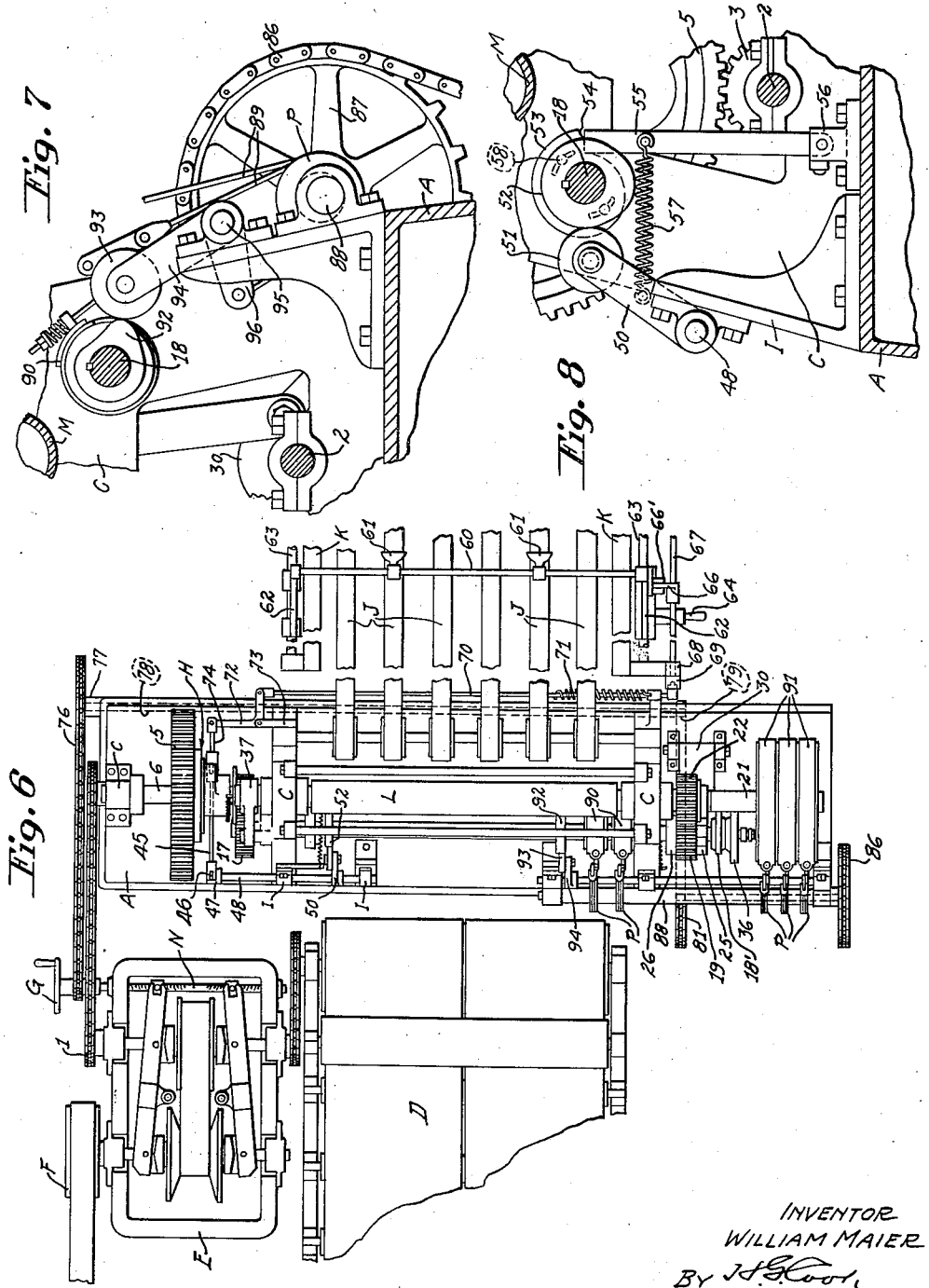
INVENTOR
WILLIAM MAIER
By J.S.Cool
ATTORNEY

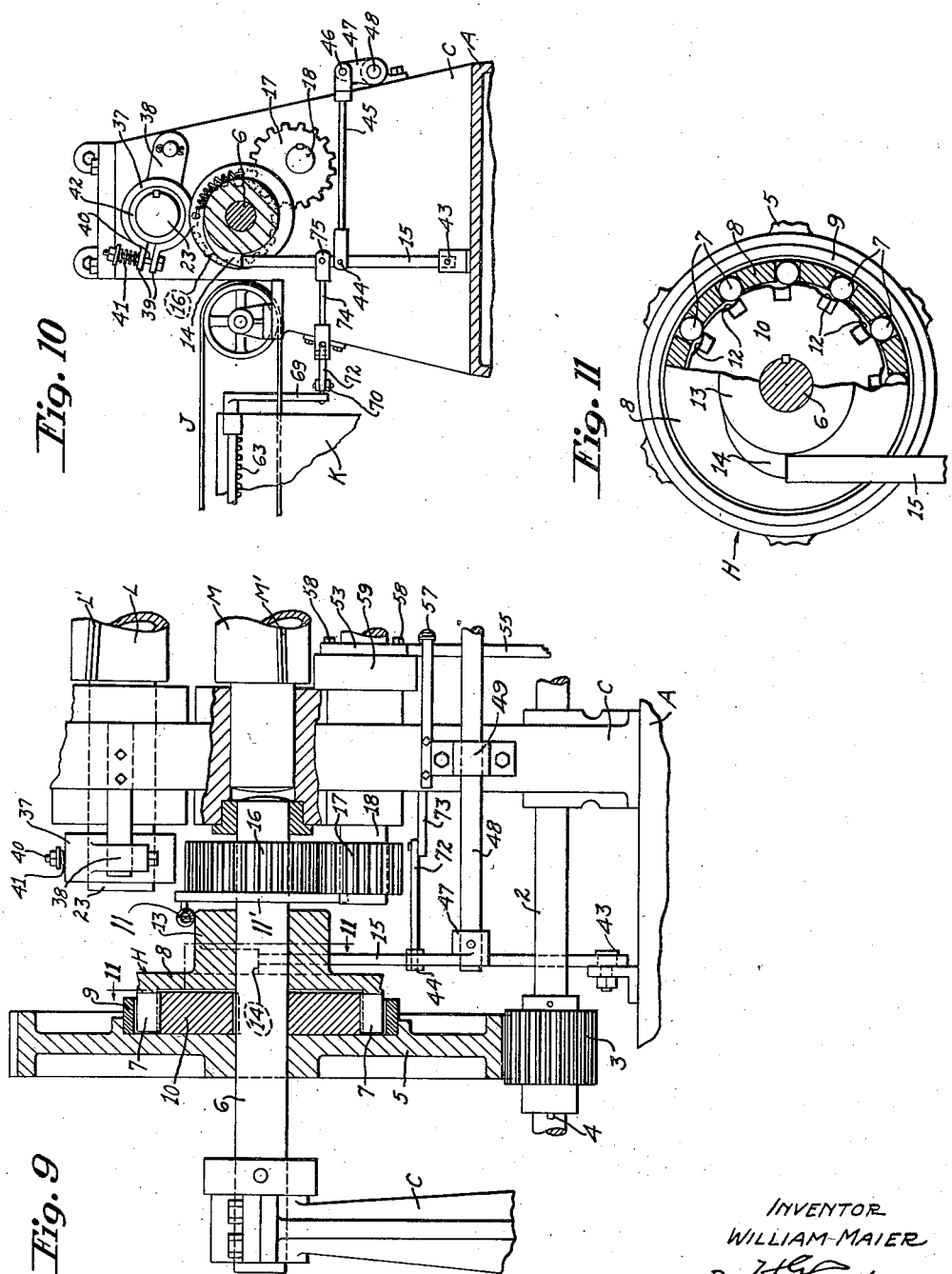

Patented July 20, 1937

2,087,520

UNITED STATES PATENT OFFICE 2,087,520

CUTTING MACHINE

William Maier, St. Louis, Mo.

Application June 17, 1936, Serial No. 85,777

6 Claims. (Cl. 164—68)

This invention relates broadly to a cutting machine of the rotary type adapted to sever a continuously moving web of material, such as corrugated board, at predetermined intervals. One of the objects of the invention is to provide cutters which are operated for the cutting operation and then brought to a complete stop before the next cutting operation takes place.

Another object is to synchronize the rotation of the cutters with the speed of travel of the web of material to be severed, so that the entire cutting operation will be performed while the cutters are moving at the same rate of speed as the moving web of material. A still further object is to start and stop the cutters with a minimum amount of shock, and to bring the rotation of said cutters up quickly to maximum speed and quickly stop said cutters by automatic means on the cutting machine.

A further object of the invention is to provide a device automatically operated by the cutting machine to apply braking tension on the cutting rolls to secure prompt stoppage of said rolls at the proper time.

Fig. 2 is a side elevation of the same.

Fig. 3 is a view taken on the line 3—3 of Fig. 1, looking in the direction of the arrows.

Fig. 4 is a view taken on the line 4—4 of Fig. 1, looking in the direction of the arrows.

Fig. 6 is a top plan view of my improved cutting mechanism showing the corrugated board forming machine and the variable speed transmission for both machines.

Fig. 7 is a view taken on the line 7—7 of Fig. 1, looking in the direction of the arrows.

Fig. 8 is a view taken on the line 8—8 of Fig. 1, looking in the direction of the arrows.

Fig. 9 is a cross-sectional view of one end of my improved cutting mechanism.

Fig. 10 is a view taken on the line 10—10 of Fig. 1, looking in the direction of the arrows.

Fig. 11 is a view taken on the line 11—11 of Fig. 9, looking in the direction of the arrows.

Figures 1, 5:
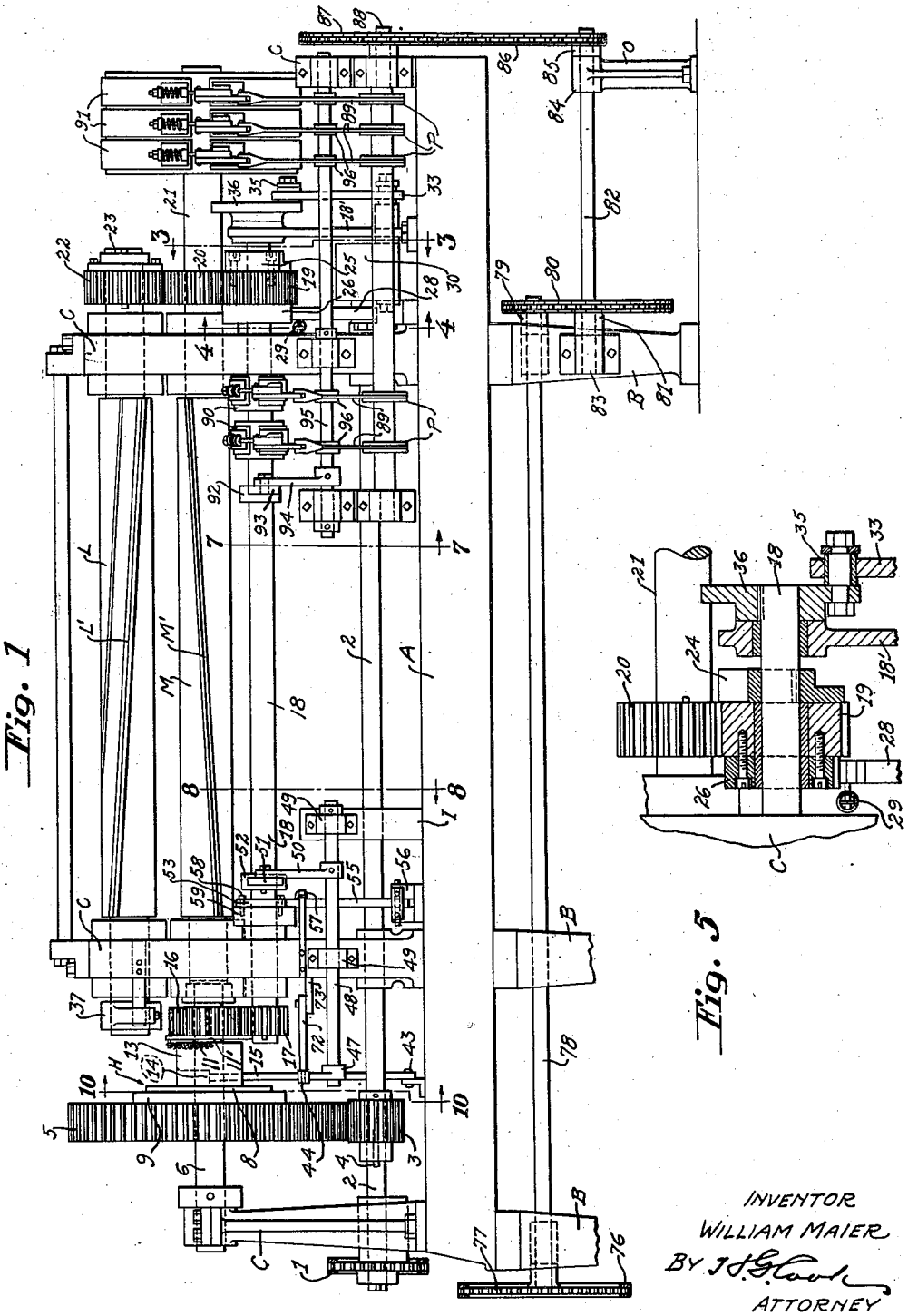
Fig. 1 is an end elevation of my improved cutting mechanism.
Fig. 5 is a view taken on the line 5—5 of Fig. 3, looking in the direction of the arrows.

In the drawings, A designates the base of my cutting machine supported by legs B. A series of standards C is mounted on the base A, which standards are adapted to support most of the operating devices of my cutting mechanism. D designates the discharge end of any conventional type of corrugated board forming machine, and E a variable speed transmission mechanism for controlling the rate of speed of both the cutting mechanism and the corrugated board forming machine. This variable speed transmission mechanism is driven through the pulley and belt F by any suitable motor (not shown). The speed of travel of the two machines, the cutter and the board forming machine, is regulated by the handle G shown in Fig. 6. The variable speed transmission illustrated in Fig. 6 is the well known Reeves variable speed transmission and does not require any further description.

For convenience in illustration and description, I show a chain drive 1 connected to the variable speed transmission (Fig. 6) and to the main drive shaft 2 of the cutting mechanism. This shaft 2 carries a small gear wheel 3 keyed to said shaft as at 4. A large gear wheel 5 is loosely mounted on a stud shaft 6 journaled in the two standards C at the left side of the cutting machine, as shown in Figs. 1, 6, and 9.

A clutch H is keyed on the shaft 6 and is adapted to be thrown intermittently into operative relationship with the large gear wheel 5. I have shown a conventional over-running type of clutch H in Fig. 11 with stud rolls 7 loosely fitted into recesses in a member 8, said rolls being movable into frictional engagement with the outer band 9 of said clutch by the circular plate 10 keyed to on the stud shaft 6. The outer band 9 is a separate ring securely affixed to the gear 5 at the circular extended portion on said gear abutting said band 9 (see Fig. 9). Keyed to the stud shaft 6 is an inner plate 10 having recesses 12 for the reception of the rolls 7. These recesses 12 are so arranged as to impart outward movement quickly to the rolls 7 to frictionally contact said rolls against the inner face of the band 9 when the clutch H is to be applied, and to release as quickly the pressure on said rolls so as to cause the clutch H to become instantaneously disengaged. The plate 8 has a relatively large, outwardly extending hub portion 13 on which is integrally formed a curved stop member 14, which is adapted to abut at its outer end against the top end of an arm 15. When the arm 15 is disengaged from the stop member 14 the clutch H instantly engages the inner face of the circular band 9 secured to the gear wheel 5, thereby causing the stud shaft 6 to rotate. 11 designates a spring secured at one end to a spring plate 11' fastened to one side of the elliptical gear wheel 16. The other end of the spring 11 is secured to the hub portion 13 of the plate 8. The spring 11 normally tends to move the plate 8 in a direction to cause the rolls 7 to ride up on the sharp curve formed at one side of the recesses 12 and engage the band 9, thereby engaging the clutch H with the constantly rotating gear wheel 5. This action is restrained as long as the arm 15 is in engagement with the stop member 14, for as soon as the arm 15 contacts the stop member 14 the plate 8 is moved sufficiently to cause the rolls 7 to move down the sharp curve formed at one side of the recesses 12, thus disengaging the clutch H from the gear wheel 5.

Also fixed on the stud shaft 6 is an elliptical gear wheel 16 which meshes with elliptical gear wheel 17 fixed on a shaft 18, which extends across the cutting machine and is journaled in one of the standards C on the frame B. The purpose of these elliptical gears is to cause the cutters to attain their maximum speed during the cutting operation, said speed being diminished both before and after said cutting operation. Loosely mounted on the shaft 18 is a gear wheel 19 which in turn meshes with a gear wheel 20 fixed to the lower cutter shaft 21, and the gear wheel 20 in turn meshes with another gear wheel 22 fixed to the upper cutter shaft 23. These constitute the driving means for the cutter shafts.

I will now describe the driving mechanism for the cutter rolls. When the shaft 18 is rotated it rotates the arm 24 which is keyed thereto, which arm 24 contacts against the abutment plate 25 which is bolted to the gear wheel 19, as seen in Fig. 3, and movement of said gear wheel 19 is caused by such contact. In order to reduce the shock of contact between the arm 24 and the abutment plate 25, I provide a disk 26 also bolted to the gear wheel 19, which disk 26 has a series of teeth 27 adapted to be engaged by a ratchet arm 28 held in engagement with said disk 26 by a spring 29, one end of said spring being fastened to said arm 28 and the other end being fastened to a standard C. To impart movement to the arm 28 I provide an angularly shaped member 30 journaled in a bearing 31 on the base A. The ratchet arm 28 is mounted as at 32 on the member 30. Another arm 33 is journaled at the free end of member 30 as shown at 34. The upper end of arm 33 is mounted as at 35 on a disk 36 keyed to the shaft 18. 18' designates a bearing standard for the shaft 18 and also serves as an abutment member for the disk 36. When the shaft 18 is rotated the disk 36 is also rotated and the arm 33 is moved upwardly, which also moves upwardly the angularly shaped member 30 and the ratchet arm 28 which, by its engagement with the teeth 27 on the disk 26, also imparts rotary movement to the gear wheel 19. This movement of the gear wheel 19 permits of the contacting of the arm 24 and the abutment plate 25 with a minimum amount of shock, as both are in movement at the same time though at different speeds. As soon as this contact between the arm 24 and the abutment plate 25 is established, the gear wheel 19 is rotating at the same speed as shaft 18, and also the cutter shafts 21 and 23 are rotating at the same speed as shaft 18. Through the chain of gears 19, 20, and 22 the initial preliminary movement imparted to the gear wheel 19 by the ratchet arm 28 is also imparted to the cutter shafts 21 and 23, so that the cutters are in motion at the time contact with the shaft 18 is established and the speed of travel of the shaft 18 is communicated to the cutter rolls with very little shock. The ratchet arm 28 merely rides around the periphery of the disk 26 under the action of the spring 29 and is ready for operation again when the cutters are to be operated.

It will be noted that when the shaft 18 is brought to a stop by means hereinafter to be described, the cutters and disk 26 may coast a very short distance, which produces a separating gap between the arm 24 and the abutment plate 25.

I provide a friction device for the top cutter roll shaft 23 consisting of a split ring 37 supported by the arm 38 mounted on one of the standards C. The open side of the split ring 37 has projecting lips 39 apertured to receive a bolt 40. Between the upper lip and the end of said bolt is placed a spring 41 to apply a yielding pressure on said split ring 37. A collar 42 is keyed to the shaft 23 so as to prevent wear on said shaft. The tension provided by this device prevents said shaft 23 from overrunning and thus disarranging the adjustment between the cutter knives.

The arm 15 which abuts against the stop member 14 on the clutch H is pivoted on the base A at 43 (see Figs. 9 and 10). Pivoted to the arm 15 as at 44 is a rod 45 which at its opposite end is pivoted as at 46 to a lever 47 fixed on a shaft 48. Said shaft is journaled as at 49 on one of the standards C and a short standard I (see Fig. 1). Near the standard I is fixed to the shaft 48 an arm 50, at the free end of which is a roller 51 for contacting with a cam 52, whereby said shaft 48 is rocked to impart movement to the arm 15 (see Fig. 1). The cam 52 is keyed to the shaft 18. Also fixed to said shaft 18 is a rotatable member 53 provided with a face having an abutting lug 54 thereon against which the upper end of an arm 55 is adapted to abut, said arm being journaled as at 56 on the base A. The arm 55 is normally held always in yielding contact with the face of the rotatable member 53 through the spring 57, one end of which is attached to the arm 55 and the other end to the standard C. When the arm 15 is rocked out of engagement with the stop member 14 so that the clutch H may engage the gear wheel 5 under the influence of the spring 11, as previously described, it is returned to rest against the hub 13 by the spring 57 (see Fig. 8), and rides around said hub until the stop member 14 comes into contact with the end of the arm 15. Upon contact with the arm 15 by the stop member 14, said member, as well as the plate 8, is stopped and the rolls 7 move down the sharp curve formed at one side of the recesses 12 in the circular plate 10, thus disengaging said clutch H from the gear wheel 5. The rotatable member 53 is secured by bolts 58 passing through elongated slots into a disk 59 fixed on the shaft 18. The purpose of this arrangement is to effectually prevent any tendency of the cutter mechanism to move backwardly, thus upsetting the accuracy of the measured length of each cut portion of the web of corrugated board. It will be noted in Fig. 8 that the abutting lug 54 is beveled to insure the slipping into position of the end of the arm 55 (see Fig. 8). The movement of the rotatable member as shown in Fig. 8 is clockwise.

In Figs. 2 and 6 is shown the mechanism for controlling the operations of the cutting rollers and the determined length between cuts. A shaft 60 is mounted slightly above the belts J, and to said shaft a number of fingers 61 is secured. These fingers are each placed just above a belt J against which they are adapted to rest when there is no corrugated board being advanced by said belts. At such time the cutting mechanism is inoperative. The speed of travel of the belts J is greater than the speed of travel of the corrugated board until the cutting mechanism has functioned, the purpose being to accelerate the speed of travel of the severed portion to produce a gap between said portions, thereby dropping the fingers 61 to permit the restoration of the operating devices for the cutting mechanism so that they will be in condition to again operate at a predetermined length of the traveling corrugated board. The shaft 60 is slidable along the length of the belts J through the carriages 62 fixed on each side of the frame K. The shaft 60 is mounted in said carriages 62. The carriages 62 are slidable along racks 63 by means of toothed wheels 62' by the crank 64 secured thereto. On one end of the shaft 60 is fixed an arm 65 which is adapted to engage a lever 66 keyed to a rod 67. Said lever 66 is contained between two lugs 66' on one of the carriages 62, so that said lever may be slid along said rod 67 in conformity with the carriage 62. It is the movement of this lever 66 and the rocking of the rod 67 which controls the operation of the cutting mechanism as to length of cut of the traveling web of board material. An index scale may be employed in connection with the slidable carriages to accurately determine the length of cut of the traveling web of material.

The inner end of the rod 67 is journaled at 68 in a bearing on the frame K. To the inner end of the rod 67 is affixed an arm 69 which at its outer end is pivoted to a shaft 70 extending across the major portion of the base A of the cutting mechanism. A retracting spring 71 is secured to the shaft 70 and to one of the standards C on the base A. As shown in Figs. 2 and 6, the cutting mechanism is in inoperative position.

When a moving web or sheet of corrugated board passes underneath the fingers 61, said fingers are lifted and the shaft 60 is rotated. Such rotation disengages the arm 65 from the lever 66, permitting said lever through the influence of the spring 71 to move inwardly, thus rocking the rod 67 and moving the arm 69 outwardly and exerting a pull on the shaft 70. At the other end of the shaft 70 remote from the spring 71 is pivoted a bell-crank 72, which is also pivoted to an arm 73 carried by the standard C. To the outer end of this bell crank 72 is pivoted an arm 74, which passes adjacent the clutch H and is pivoted to the arm 15 at 75. When the fingers 61 ride up on the sheet of traveling corrugated board, the rod 67 is rotated, which pulls on the shaft 70, which moves the bell-crank 72 to cause the disengagement of the arm 15 from the stop member 14, thus permitting the plate 10 to rotate, which throws the clutch H into operative engagement with the large gear wheel 5 and, through the chain of driving mechanism previously described, to operate the cutters.

The upper cutter roll L and the lower cutter roll M are provided with curved knives L' and M' which co-operate with each other when the cutter rolls are rotated to sever the web of corrugated board.

In order to stop the rotation of the cutter rolls L and M, I provide the following mechanism: On the screw shaft N of the variable speed transmission E is geared a sprocket chain 76, which is connected to a toothed wheel 77 on the shaft 78 which extends substantially across the machine underneath the base A. On the end of the shaft 78 remote from the driven end another small, toothed wheel 79 is fixed and a sprocket chain 80 runs to a large, toothed wheel 81 fixed on a shaft 82 provided with a bearing 83 on the pedestal B and another bearing 84 on a bearing support O. On the end of the shaft 82 opposite the large, toothed wheel 81 is a small, toothed wheel 85 which meshes with a sprocket chain 86, which passes upwardly to another large, toothed wheel 87 fixed on a shaft 88 journaled on the base A. The shaft 88 is eccentrically mounted (see Fig. 7) in its bearings, and on said shaft is loosely mounted a series of grooved wheels P about which straps 89 pass adapted to operate brake drums 90 and 91. The brake drums 90 are on shaft 18 and the brake drums 91 are on shaft 21 of the lower cutter roll M. In Fig. 2 a view typical of such braking mechanism is shown of the conventional type, and it is believed detailed description thereof is not essential, as it forms no part of my present invention, except in so far as it promptly acts to stop the moving parts of the cutter mechanism. In Fig. 7 it will be noted that a cam 92 is keyed to shaft 18, which cam contacts with the roller 93 on the lever 94, which in the position shown in Fig. 7 is causing the braking action to be exerted through the rocking of the shaft 95 carrying the lever 94. Another series of arms 96 is carried by the shaft 95, and to the free end of each arm 96 one end of a strap 89 operating the brake drums 90 and 91 is fastened. When the shaft 18 rotates to release the outwardly projecting lip of the cam 92 from contact with the roller 93, the braking action on shafts 18 and 21 is released.

By the movement of handle G on the variable speed transmission E, the shaft 88 is adjusted accordingly.

The timing mechanism by means of which an infinite number of different sizes of severed pieces may be obtained within the range of the machine and which I have shown and described herein more or less diagrammatically is the timing mechanism shown and described in detail in my two United States Patents No. 1,824,163, issued September 22, 1931, and No. 1,790,937, issued February 3, 1931.

I claim:

1. In a cutting mechanism, a supporting base, cutter rolls mounted on said base, driving means for said cutter rolls controlled by a variable speed mechanism, said cutter rolls being adapted to be driven at periodical intervals, a driving mechanism mounted on one of said cutter rolls adapted to receive initial movement prior to becoming connected with said driving means, means for permitting a slight overrun in said driving mechanism whereby the driving and driven elements in said driving mechanism are slightly separated during the stop period, and braking means for stopping the rotation of the moving shafts in said mechanism.

2. In a cutting mechanism, a supporting base, cutter rolls mounted on said base, driving means for said cutter rolls controlled by a variable speed mechanism, said cutter rolls being adapted to be driven at periodical intervals, a driving mechanism mounted on one of said cutter rolls adapted to receive initial movement prior to becoming connected with said driving means, means for permitting a slight overrun in said driving mechanism whereby the driving and driven elements in said driving mechanism are slightly separated during the stop period, braking means for stopping the rotation of the moving shafts in said mechanism, and means for regulating the periods between the stop and start movements of the cutter mechanism.

3. In a cutting mechanism, a supporting base, cutter rolls mounted on said base, driving means for intermittently operating said cutter rolls controlled by a variable speed mechanism, a traveling web of material adapted to be cut by said cutter rolls at predetermined intervals, means associated with said traveling web of material for putting said cutter rolls into operation, a clutch controlled by said means for engagement with the main driving means for the cutter rolls, a driving mechanism, also controlled by said means, mounted on one of said cutter rolls adapted to receive initial movement prior to becoming connected with said driving means, means for permitting a slight overrun in said driving mechanism whereby the driving and driven elements in said driving mechanism are slightly separated during the stop period of said driving mechanism, and braking means for stopping the rotation of the moving shafts in said mechanism.

4. In a cutting mechanism, a supporting base, cutter rolls mounted on said base, driving means for intermittently operating said cutter rolls controlled by variable speed mechanism, a traveling web of material adapted to be cut by said cutter rolls at predetermined intervals, means associated with said traveling web of material for putting said cutter rolls into operation, a clutch controlled by said means for engagement with the main driving means for the cutter rolls, a driving mechanism, also controlled by said means, mounted on one of said cutter rolls adapted to receive initial movement prior to becoming connected with said driving means, means for permitting a slight overrun in said driving mechanism whereby the driving and driven elements in said driving mechanism are slightly separated during the stop period of said driving mechanism, braking means for stopping the rotation of the moving shafts in said mechanism, and means for predetermining the length of material between the cuts.

5. In a cutting mechanism, a supporting base, cutter rolls mounted on said base, driving means for intermittently operating said cutting rolls, a driving mechanism operable by said driving means, said driving mechanism being composed of a driving member and a driven member, said driving mechanism being secured on the shaft of one of said cutter rolls, means for imparting initial rotary movement to the driven member of said driving mechanism and to the shafts of the cutter rolls before the driving and driven members of said driving mechanism contact, means for permitting a slight separation between the driving and driven members as the driving member comes to a stop, and braking means for stopping the rotation of the several operating shafts in said cutting mechanism.

6. In a cutting mechanism, a supporting base, cutter rolls mounted on said base, driving means for said cutter rolls controlled by a variable speed mechanism, a traveling web of material adapted to be cut by said cutter rolls into predetermined lengths, a series of fingers adapted to contact the upper surface of said web of material, a shaft associated with said fingers, an arm operable by said shaft, a rotatable disk provided with a stop member adapted to contact with one end of said arm, means for releasing said arm from said stop member thereby permitting said disk to rotate, a clutch associated with said disk and caused to operate when said disk is rotated, said clutch being adapted to connect said driving means with the shafts of the cutter rolls, a driving mechanism attached to the main drive shaft for operating the cutter rolls, said driving mechanism consisting of a driving member and a driven member, a ratchet member associated with said driven member whereby initial rotary movement may be imparted to said driven member and through it to the cutter roll shafts prior to the contacting of the driving and driven members, means for permitting a gap between said driving and driven members as said members are released from the main drive member, braking means associated with one of the shafts of the cutter rolls, additional braking means associated with the main drive shaft of the cutting mechanism, such braking devices being adapted to stop the movement of the main operating devices of the cutting mechanism, and means for predetermining the length of material between cuts.

WILLIAM MAIER.